United States Patent
Ward

(10) Patent No.: US 6,952,944 B1
(45) Date of Patent: Oct. 11, 2005

(54) MOVABLE ZERO POINT POSITION SENSOR

(75) Inventor: Charles E. Ward, Sarasota, FL (US)

(73) Assignee: Honeywell International Inc., Morristown, NJ (US)

( * ) Notice: Subject to any disclaimer, the term of this patent is extended or adjusted under 35 U.S.C. 154(b) by 344 days.

(21) Appl. No.: 10/266,670

(22) Filed: Oct. 9, 2002

Related U.S. Application Data

(60) Provisional application No. 60/360,106, filed on Feb. 28, 2002.

(51) Int. Cl.[7] ............................................. G01B 21/00
(52) U.S. Cl. ........................................ 73/1.75; 73/1.79
(58) Field of Search ............................... 73/1.75, 1.79, 73/1.81; 116/281; 324/202; 702/87, 88, 94, 702/97

(56) References Cited

U.S. PATENT DOCUMENTS

| | | | | |
|---|---|---|---|---|
| 4,490,804 A | * | 12/1984 | Martinsons | .................. 702/94 |
| 4,490,814 A | * | 12/1984 | Shenk | ......................... 367/140 |
| 4,703,815 A | * | 11/1987 | Hirano et al. | ............. 177/25.14 |
| 6,075,371 A | * | 6/2000 | Kitamura | ..................... 324/716 |
| 6,460,429 B1 | * | 10/2002 | Staker | .......................... 74/513 |

FOREIGN PATENT DOCUMENTS

JP          2002-258189 A      9/2000

\* cited by examiner

Primary Examiner—Robert Raevis
(74) Attorney, Agent, or Firm—Kris T. Fredrick; Kermit D. Lopez; Luis M. Ortiz

(57) ABSTRACT

A sensor assembly is coupled with a control linkage and detects displacement of the control linkage and produces an output signal indicative of that displacement. The zero-point of the sensor assembly is not necessarily aligned with the zero-point of the control linkage when the two systems are coupled together. Instead, the control linkage is placed in its zero position and the sensor assembly determines its current positional reading at that time. This reading is stored as a zero-offset value which is then used, during normal operation of the sensor, to adjust the output signal of the sensor assembly when subsequent control linkage displacements are sensed.

5 Claims, 3 Drawing Sheets

MOVABLE ZERO POINT POSITION SENSOR

RELATED APPLICATIONS

This application relates to and claims priority from U.S. Application Ser. No. 60/360,106 filed Feb. 28, 2002 entitled MOVABLE ZERO POINT POSITION SENSOR, the disclosure of which is hereby incorporated in its entirety by reference.

FIELD OF THE INVENTION

The present invention relates to sensors and, more particularly, to sensors that detect and report the condition of control linkages.

BACKGROUND OF THE INVENTION

As mechanical systems and devices become more complex through the incorporation of microprocessors and other electronics, the use of, and reliance on, sensors have become increasingly important for monitoring the operation of these types of systems and devices.

Rotary and linear sensors are frequently used to detect and report the location or position of a shaft or other mechanical linkage with reference to a known position. This known position, or zero-point, is considered the origin from which to measure and calculate displacement values. For example, a shaft may rotate 80 degrees from the zero-point or −25 degrees from the zero-point. The sensor detects this rotary displacement relative to the zero-point and provides an output signal or value indicative of the detected displacement.

For a sensor to accurately indicate or report displacement (angular or linear), the condition in which the sensor produces a zero output must coincide with the physical zero position of the mechanical linkage being sensed.

In the past, when a sensor was connected to a mechanical system, the proper alignment of the sensor and linkage was accomplished using such mechanisms as set screws, mechanical offsets, variable spacers, etc.

FIG. 1 depicts an exemplary prior art rotary sensor arrangement 100. According to this arrangement, a sensor 102 has an input voltage 112 that is modulated according to the sensor's physical condition in order to produce an output signal 114. The sensor 102 has a rotary shaft 104 whose position relative to a zero-point controls the value of the output signal 114. A device designer using the sensor 102 would have data sheets that provide a description of the sensor 102 including the range of values for the output signal 114 and the correspondence between the value and the rotary position of the shaft 104.

An annular unit 110 provides mechanical and operative coupling between the sensor shaft 104 and a shaft 106. The shaft 106, for example, can be a steering valve, a shaft connected to an acceleration pedal, or some other control linkage. Because of the coupling unit 110, as the control shaft 106 rotates, the sensor shaft 104 rotates as well.

Within the mechanical system of control shaft 106 (e.g., a forklift, an automobile, etc), there is some objective physical position corresponding to zero displacement of that control linkage or shaft 106. Similarly, there is a physical position of the sensor shaft 104 that corresponds to the sensor 102 reporting zero displacement. For the sensor and control system to operate effectively, these two zero positions should be aligned.

Set screws 108a and 108b are used when aligning the different shafts 104 and 106. This alignment arrangement has a number of drawbacks including being time and labor intensive. Another problem is that the set screws 108a and 108b bite into the shaft material to provide a grip. This results in shaft scars that cause subsequent zero adjustments to become much more difficult when the sensor needs to be realigned. Similar problems exist in linear sensors where a sensor or shaft mountings need to be adjustable, or otherwise offset, so that sensors and their control shafts can be properly aligned.

A need, therefore, exists for a sensor zero-point alignment procedure and device wherein the zero-point alignment can be performed in an efficient manner and multiple times over the lifetime of a system.

SUMMARY OF THE INVENTION

Embodiments of the present invention address these and other needs by providing a sensor arrangement that does not require precise alignment of the sensor and control linkage zero positions.

In particular, one aspect of the present invention relates to a method for automatically providing zero correction to a sensor reading. According to this method, a current position of a control linkage is sensed to determine a first value. The first value is then adjusted by a zero-offset value to calculate a second value. It is this second value on which the output signal of the sensor is based.

Another aspect of the present invention relates to a sensor assembly that is coupled with a mechanical linkage wherein the sensor assembly is configured to indicate a displacement of the linkage from a first position. According to this aspect, the sensor assembly includes a sensor that is configured to determine a current value corresponding to a current position of the linkage, a memory configured to store a zero-point value corresponding to the linkage being in the first position, and a controller. In particular, the controller is configured to adjust the current value based on the zero-point value and then output the adjusted current value.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

To aid with the understanding of the present invention, exemplary embodiments are presented within the context of a specific environment involving a rotary sensor. In general, however, the invention is applicable to other types of sensors as well as a variety of different control linkage environments. In other instances, well-known structures, devices, and processes are shown in block diagram form, herein, in order to avoid unnecessarily obscuring the present invention.

Figure 1:
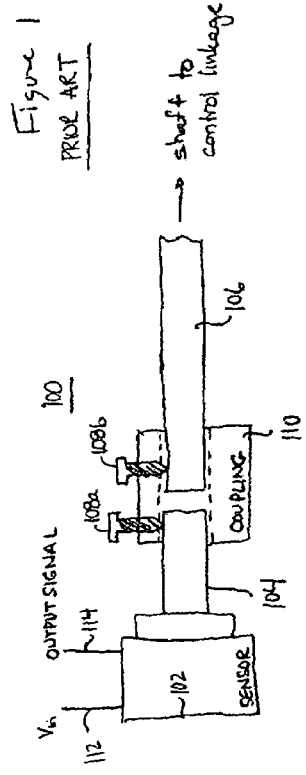
FIG. 1 illustrates a prior art sensor assembly.
Figure 2:
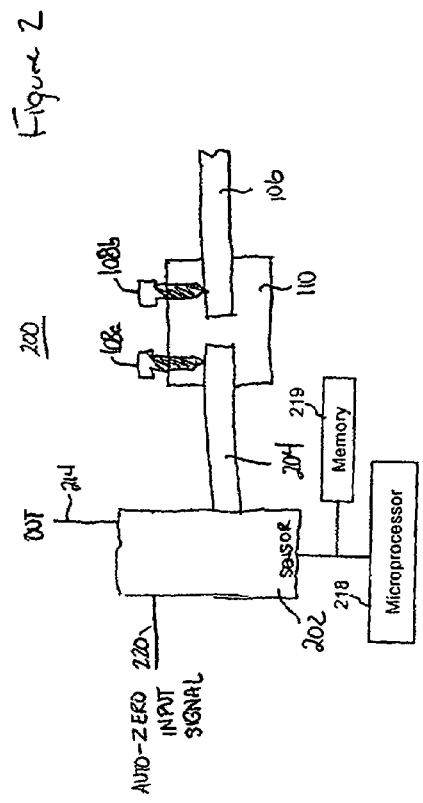
FIG. 2 illustrates an exemplary sensor assembly according to an embodiment of the present invention.

FIG. 2 shows an exemplary embodiment of the present invention. In this figure, elements similar to the conventional sensor and shaft arrangement of FIG. 1 are provided with identical element numbers. According to this embodiment, the sensor 202, with sensor shaft 204, is placed in a host system 200 which has its control linkage 106 mechanically set to its zero point. The sensor 202 is coupled with the control shaft 106 via a coupling unit 110. However, unlike the conventional system 100, the value or position that the present sensor 202 reads at this time is not critical and can be any valid output.

The sensor 202 includes a microprocessor or microcontroller 218 and an input 220 that acts as an auto-zero control. One of ordinary skill would readily recognize that the input 220 could be a push (or other type) button, a pull-up pin, a serial input, or other equivalent input circuitry configured to receive a signal. When the sensor 202 receives a signal on the input 220, this is an indication to the controller or processor 218 within the sensor 202 that the sensor's current position is intended to be zero or the starting-point. The sensor 202 takes a reading of the shaft position 204 and stores that value in a memory 219. In a preferred embodiment, the memory 219 is non-volatile memory integral to the controller 218.

During normal operation when the sensor 202 is providing an output signal 214, this output signal 214 (produced by the sensor 202 to indicate the position of the shaft 204) is adjusted, by software executing on the controller 218, based on the zero value stored in the memory 219. The output signal, therefore, reflects a displacement value adjusted by the zero-offset value and is not merely the raw value sensed by the sensor 202.

These same principles apply equally to adjust zero-points for sensors that vary with linear displacement. The particular output that is reported from the sensor is not critical as long as adjustments are performed to adjust, based on the stored zero-point, the actual reading reported by the sensor's output signal.

Figure 3:
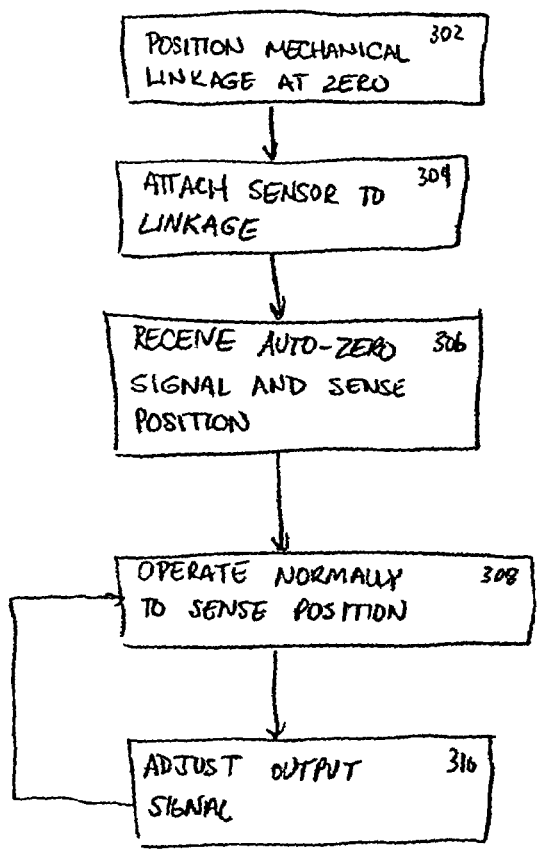
FIG. 3 illustrates a flowchart for providing control linkage sensing according to an embodiment of the present invention.

FIG. 3 provides a flowchart of an exemplary method of employing embodiments of the present invention in systems such as forklift position sensors, train suspension linkages, earth mover bucket position sensors, and linear door sensors in public transit trains.

In step 302, the control linkage 106 of the system 200 is mechanically located in its physical position or orientation that corresponds to a zero-point or origin. Next, in step 304, a sensor 202 is attached or coupled with the control linkage 106 without concern for the zero-point of the sensor 202.

Once the sensor 202 and the control linkage 106 are connected, the sensor 202 receives a signal, in step 306, which informs it to take a current position reading and store that value as the zero-point of the sensor 202. Once the sensor's zero-point is determined and stored, the sensor 202 can operate normally to sense, in step 308, a position of the control linkage 106.

In step 310, the sensor 202 adjusts the value associated with the sensor's current position based on the stored zero-point so that the output signal 214 of the sensor 202 accurately reflects the displacement of the control shaft 106 from its zero-point.

Figure 4A:
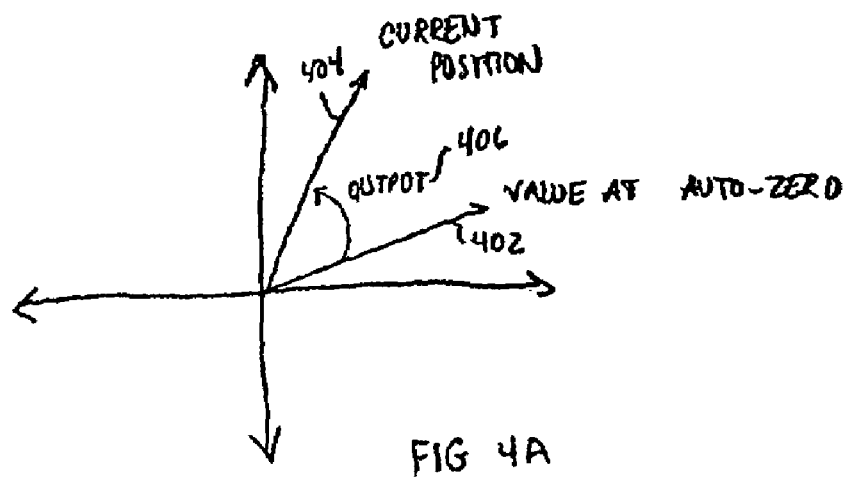
FIGS. 4A and 4B graphically depict an exemplary relationship between a current position value and a zero-offset value.
Figure 4B:
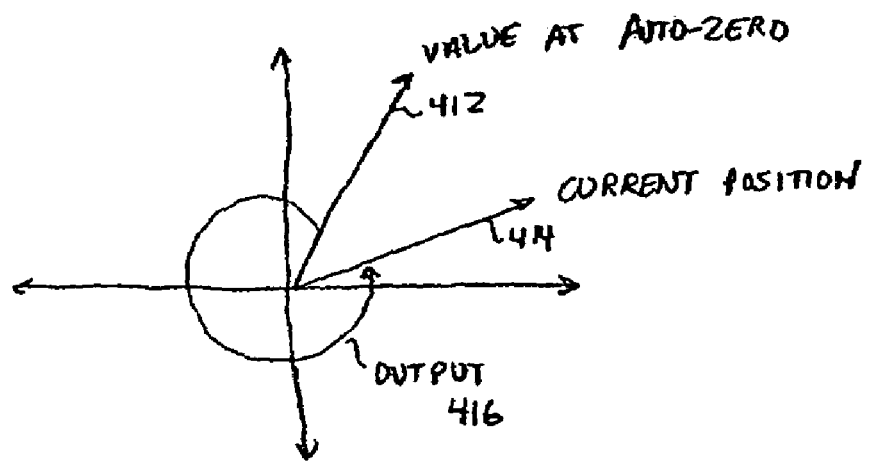

FIGS. 4A and 4B illustrate two possible cases arising when determining how to adjust the output signal 214 from the sensor 202. According to these exemplary cases, the sensor 202 outputs a minimum value indicating a control shaft position at zero degrees, a maximum value at 360 degrees, and a range of values in-between. For example, $0000 could represent zero degrees and $FFFF could represent 360 degrees. However, a skilled artisan would recognize that these values are only exemplary in nature and could include other ranges or be calibrated in terms of radians or otherwise modified.

In FIG. 4A, the value stored in memory 219 for the auto-zero location corresponds to 35 degrees 402. If the sensor 202 subsequently reads a current shaft position corresponding to 80 degrees 404, then the output signal 214 of the sensor 202 is adjusted by subtracting the auto-zero value 402 from the current position value 404. Accordingly, the sensor's output signal 214 provides a value that is indicative not of 80 degrees, but rather of 45 degrees 406.

In FIG. 4B, the value stored in memory 219 for the auto-zero location corresponds to 70 degrees 412. If the sensor 202 subsequently reads a current shaft position corresponding to 30 degrees 414, then the adjustment routine described above would result in an invalid negative number as the output signal 214. In this instance, the maximum reading (e.g., 360 degrees) is added to the current position 414 and then the auto-zero value 412 is subtracted from that sum. As a result, the sensor 202 correctly reports a value corresponding to a control shaft displacement of 320 degrees 416.

Exemplary C language code is provided below to demonstrate an exemplary software routine implementation of the auto-zero adjustment procedures of step 310 that can execute in the controller 218.

```
// entering the routine, theta represents the shaft's current position
//   at the end of the routine theta has been adjusted by the zero-point
// ulint1 is a working variable
// auto_zero is the value stored when an auto-zero input signal was
// received
if (theta >= autozero)        /* see FIG. 4A */
    ulint1 = (unsigned long)theta − (unsigned long)auto_zero;
else                          /* see FIG. 4B */
    ulint1 = ( 0xFFFF + (unsigned long)theta ) −
        (unsigned long)auto_zero;
theta = (unsigned int)ulint1;
//end auto zero routine
```

According to embodiments of the present invention, therefore, the installation and adjustment of sensors and control shafts become much less of a problem than in conventional systems. First, the labor and time needed to precisely align a sensor and control shaft is avoided. Second, if the system ever needs adjustment, the different shafts can be positioned to avoid the pits and scarring caused by earlier use of set screws.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A method for automatically providing zero correction to a sensor reading, said method comprising the steps of:

sensing a current position of a control linkage to determine a first value;

coupling a sensor to the control linkage set in a starting position;

sensing an initial position of the sensor when coupled with the control linkage in the starting position;

adjusting the first value by a zero-offset value to calculate a second value; and determining the zero-offset value based on the initial position;

storing the zero-offset value in a memory device;

if the first value is greater than or equal to the zero-offset value, then determining the second value by subtracting the zero-offset value from the first value; and if the first value is less than the zero-offset value, then determining the second value by subtracting the first value from the sum of the maximum value and the zero-offset value; and providing an output signal based on the second value.

2. The method according to claim 1, wherein the coupling step is performed independent of the position of the sensor.

3. The method according to claim 1, wherein the sensor is a rotary sensor.

4. The method according to claim 1, wherein the sensor is a linear sensor.

5. The method according to claim 1, further comprising the step of:

storing a maximum value in the memory device.

* * * * *